(12) United States Patent
Azami

(10) Patent No.: US 10,608,244 B2
(45) Date of Patent: Mar. 31, 2020

(54) LITHIUM ION SECONDARY BATTERY

(71) Applicant: NEC CORPORATION, Tokyo (JP)

(72) Inventor: Takeshi Azami, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 15/560,890

(22) PCT Filed: Mar. 22, 2016

(86) PCT No.: PCT/JP2016/059001
§ 371 (c)(1),
(2) Date: Sep. 22, 2017

(87) PCT Pub. No.: WO2016/152861
PCT Pub. Date: Sep. 29, 2016

(65) Prior Publication Data
US 2018/0123123 A1   May 3, 2018
US 2019/0280290 A2   Sep. 12, 2019

(30) Foreign Application Priority Data
Mar. 24, 2015   (JP) ................................. 2015-061504

(51) Int. Cl.
*H01M 4/36*      (2006.01)
*H01M 4/48*      (2010.01)
*H01M 4/587*     (2010.01)
*H01M 10/0525*   (2010.01)
*H01M 10/0585*   (2010.01)
(Continued)

(52) U.S. Cl.
CPC .............. *H01M 4/364* (2013.01); *C01B 32/00* (2017.08); *H01M 4/13* (2013.01); *H01M 4/483* (2013.01); *H01M 4/587* (2013.01); *H01M 10/0525* (2013.01); *H01M 10/0585* (2013.01);
(Continued)

(58) Field of Classification Search
CPC ...... H01M 4/364; H01M 4/483; H01M 4/587; H01M 10/0525; H01M 10/0585
See application file for complete search history.

(56) References Cited

U.S. PATENT DOCUMENTS

2008/0248387 A1* 10/2008 Hinoki .................... H01M 4/13
                                                    429/209
2012/0164530 A1*  6/2012 Temmyo ............... H01M 4/133
                                                    429/211
2015/0111102 A1*  4/2015 Ham ..................... H01M 4/133
                                                    429/218.1

FOREIGN PATENT DOCUMENTS

JP   A-2008-153117   7/2008
JP   A-2010-212228   9/2010
(Continued)

OTHER PUBLICATIONS

International Search Report dated Jun. 28, 2016, in corresponding PCT International Application.

*Primary Examiner* — Osei K Amponsah
(74) *Attorney, Agent, or Firm* — Finnegan, Henderson, Farabow, Garrett & Dunner, L.L.P.

(57) ABSTRACT

A lithium ion secondary battery having more improved cycle characteristics is provided. The present invention relates to a lithium ion secondary battery having a negative electrode comprising a graphite and a silicon oxide having a composition represented by $SiO_x$ (0<x≤2), wherein AG/AS is within a range of 0.6 or more and 1.6 or less when a particle number average aspect ratio of the graphite is defined as AG and a particle number average aspect ratio of the silicon oxide is defined as AS.

9 Claims, 2 Drawing Sheets

(51) Int. Cl.
  *H01M 4/13*  (2010.01)
  *C01B 32/00*  (2017.01)
  *H01M 4/02*  (2006.01)

(52) U.S. Cl.
  CPC .. *H01M 2004/027* (2013.01); *H01M 2220/20* (2013.01); *Y02P 70/54* (2015.11); *Y02T 10/7011* (2013.01)

(56) References Cited

FOREIGN PATENT DOCUMENTS

| | | |
|---|---|---|
| JP | A-2013-101921 | 5/2013 |
| JP | A-2014-067583 | 4/2014 |
| JP | A-2014-067639 | 4/2014 |
| JP | A-2015-035317 | 2/2015 |
| WO | WO 2014 133165 A1 | 9/2014 |

* cited by examiner

LITHIUM ION SECONDARY BATTERY

CROSS-REFERENCE TO RELATED PATENT APPLICATIONS

This application is a National Stage Entry of International Application No. PCT/JP2016/059001, filed Mar. 22, 2016, which claims priority from Japanese Patent Application No. 2015-061504; filed Mar. 24, 2015. The entire contents of the above-referenced applications are expressly incorporated herein by reference.

TECHNICAL FIELD

The present invention relates to a lithium ion secondary battery, a method for manufacturing the same, a vehicle and a power storage system using the lithium ion secondary battery.

BACKGROUND ART

Lithium ion secondary batteries are characterized by their small size and large capacity and are widely used as power sources for electronic devices such as mobile phones and notebook computers, and have contributed to the improvement of the convenience of portable IT devices. In recent years, attention has also been drawn to the use in large-sized applications such as drive power supplies for motorcycles and automobiles, and storage batteries for smart grids. As the demand for lithium ion secondary batteries has increased and they are used in various fields, batteries have been required to have characteristics; such as further higher energy density, lifetime characteristics that can withstand long-term use, and usability under a wide range of temperature conditions.

In general, carbon-based materials have been used for a negative electrode of the lithium-ion secondary battery, but in order to increase the energy density of the battery, the use of silicon-based materials having a large capacity of absorbing and desorbing lithium ions per unit volume has been studied for the negative electrode. However, the silicon-based material deteriorates due to expansion and contraction that are repeated by charging and discharging lithium, and therefore have a problem in the cycle characteristics of the battery.

Various proposals have been made to improve the cycle characteristics of the lithium ion secondary battery using a silicon-based material for a negative electrode. Patent Document 1 discloses a method of improving the charge and discharge cycle life of a non-aqueous electrolyte secondary battery by mixing silicon oxide with elemental silicon and further covering its periphery with amorphous carbon to relax the expansion and contraction of the electrode active material itself. Patent Document 2 discloses that, by specifying the size ratio of silicon oxide particles and graphite particles in a negative electrode comprising silicon oxide and graphite, the silicon oxide particles are disposed within spaces formed by graphite particles to suppress the change in the volume of the entire negative electrode even when the silicon oxide expands, and thus, the deterioration of the cycle characteristics can be suppressed.

CITATION LIST

Patent Document

Patent Document 1: Japanese Patent Laid-Open Publication No. 2008-153117
Patent Document 2: Japanese Patent Laid-Open Publication No. 2013-101921

SUMMARY OF INVENTION

Technical Problem

However, there is a problem that the discharge capacity decreases by repeating charge and discharge cycles even in the lithium ion secondary battery described in the above-mentioned prior art documents, and thus, further improvement of the cycle characteristics is required.

An object of the present invention is to provide a lithium ion secondary battery that solves the above-mentioned problems.

Solution to Problem

The lithium ion secondary battery of the present invention is a battery having a negative electrode comprising a graphite and a silicon oxide having a composition represented by $SiO_x$ ($0<x\leq2$), wherein AG/AS is within a range of 0.6 or more and 1.6 or less when a particle number average aspect ratio of the graphite is defined as AG and a particle number average aspect ratio of the silicon oxide is defined as AS.

Advantageous Effect of Invention

According to the present invention, a lithium ion secondary battery having more improved cycle characteristics is provided.

DESCRIPTION OF EMBODIMENTS

Figure 1:
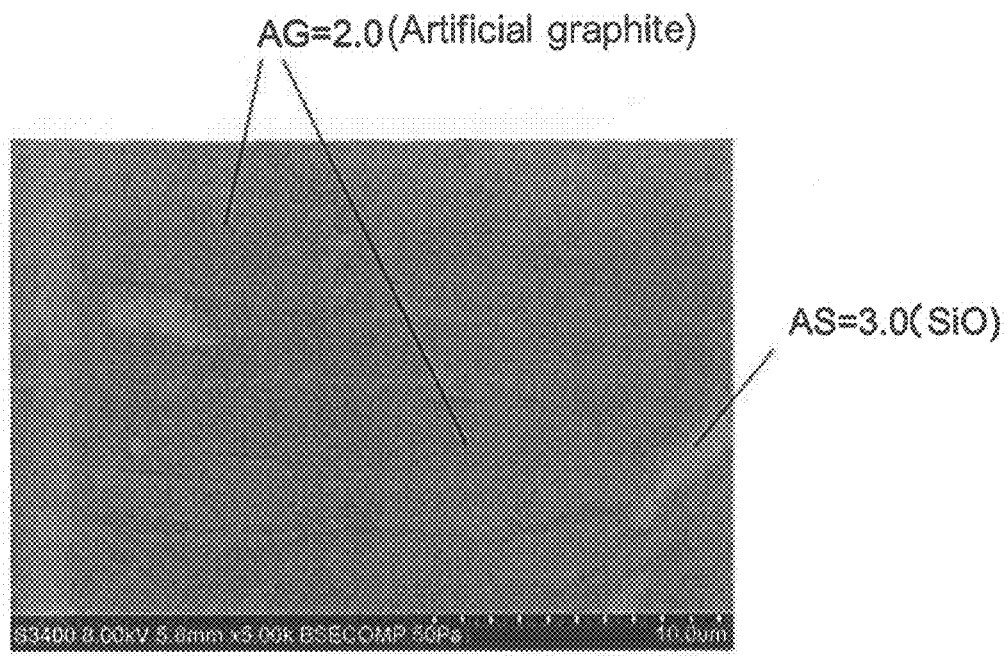
FIG. 1 is an SEM-observed-picture (5,000 magnifications) of a negative electrode cross section in which the aspect ratio (AG) of the artificial graphite is 2.0 and the aspect ratio (AS) of SiO is 3.0.

Embodiments of the present invention will be described for each constituting member of the lithium ion secondary battery.

<Negative Electrode>

The negative electrode has a structure in which a negative electrode active material is laminated on a current collector as a negative electrode active material layer integrated by a negative electrode binder. The negative electrode active material is a material capable of reversibly absorbing and desorbing lithium ions with charge and discharge.

The negative electrode active material comprises graphite and silicon oxide, which respectively exist as particles in the negative electrode.

The graphite used in this embodiment may be either natural graphite or artificial graphite. The shape of the graphite is not particularly limited and may be any shape. Examples of the natural graphite include flake-like graphite, scaly graphite, earthy graphite and the like, and examples of the artificial graphite include massive artificial graphite, flake-like artificial graphite, and spherical artificial graphite such as MCMB (mesophase microbeads). The graphite to be used may be coated with a carbon material or the like.

The graphite to be used preferably has a ratio (G/D) in the range of 2.0 to 5.0, wherein the ratio (G/D) is a ratio of intensity G of a peak at 1550 to 1650 cm$^{-1}$ to intensity D of a peak at 1300 to 1400 cm$^{-1}$ by Raman spectroscopic analysis. Here, the peak intensity G is assigned to crystalline carbon, the peak intensity D is assigned to amorphous carbon, and the higher G/D ratio means that the graphite has higher crystallinity. By adjusting the G/D ratio of the graphite to be used in the range of 2.0 to 5.0, it is possible to obtain graphite which can follow the expansion and contraction of the silicon oxide at the time of charging and discharging, and therefore it is preferable in the present embodiment. Graphite having G/D in the range of 2.0 to 5.0 means that the degree of graphitization in the negative electrode active material is high.

The graphite particles are contained in an amount of preferably 50% by mass, more preferably 70% by mass or more and 97% by mass or less, in the negative electrode active material.

The silicon oxide used in the present invention has a composition represented by SiO$_x$ (where 0<x≤2). A particularly preferred silicon oxide is SiO. The silicon oxide particles may be coated with a carbon material or the like. In general, a carbon-coated silicon oxide particle can provide a secondary battery having excellent cycle characteristics, but according to the present invention, cycle characteristics can be further improved. The silicon oxide particles are contained in the negative electrode active material in an amount of preferably 1% by mass or more and 20% by mass or less, more preferably 3% by mass or more and 10% by mass or less.

In the present invention, AG/AS is within a range of 0.6 or more and 1.6 or less, preferably 0.8 or more and 1.2 or less, and particularly preferably 0.9 or more and 1.1 or less in the negative electrode when an aspect ratio of the graphite particles on a number average of the particles is defined as AG and an aspect ratio of the silicon oxide particles on a number average of the particles is defined as AS. As the graphite particles and the silicon oxide particles have close aspect ratios, it is presumed that the graphite particles are less susceptible to interference due to the expansion and contraction occurring during charging and discharging of the silicon oxide particles. Therefore, in the present invention, damage of the graphite particles and the coating thereof is suppressed to improve the cycle characteristics. The aspect ratio of the graphite particles and the silicon oxide particles can be adjusted by particle shape control with shape separation and crushing treatment of the particles.

The aspect ratio is a length ratio of the long axis direction to the short axis direction in a particle and for example, it can be confirmed by observing a particle section with an electron microscope such as SEM (Scanning electron microscope). A particle number average value of the ratio of the longest diameter to the shortest diameter of each particle in a particle section can be employed as the aspect ratio.

In the present invention, it is preferable for the cycle characteristics of the battery that both of the aspect ratios of the graphite particles and the silicon oxide particles are higher. Preferably, the particle number average aspect ratios of the graphite particles and the silicon oxide particles are respectively 2 or more, and more preferably, the particle number average aspect ratios of the graphite particles and the silicon oxide particles are respectively 3 or more.

In the present embodiment, the cycle characteristics may be further improved by controlling the particle diameter in addition to the particle shape. When $D_{50G}$ is the median diameter of the graphite particles, and $D_{50S}$ is the median diameter of the silicon oxide particles. It is preferable that ranges of each median diameter satisfy:

5.0 μm<$D_{50G}$<25.0 μm, 1.0 μm<$D_{50S}$<15.0 μm, 0.5 μm<$D_{50H}$<15.0 μm.

In addition, it is also preferable that $D_{50H}/D_{50S}$ is within a range of 0.6 to 5.0. By setting the particle sizes within the above range, preferable cycle characteristics can be obtained. This is because the impregnation and permeability property of the electrolytic solution are particularly improved within the above range. Because the impregnation property of the electrolytic solution is particularly excellent, it is presumed that the effect of an additive in the electrolytic solution is readily realized. Measurement of the median diameter may be carried out by a laser diffraction/scattering type particle size distribution measuring device.

A negative electrode active material other than the graphite and the silicon oxide may be additionally used in the negative electrode. The additional negative electrode active material is not limited, and known materials may be used, and the examples thereof include silicon-based materials such as silicon alloys, silicon composite oxides, and silicon, nitride; carbon-based materials such as amorphous carbon, and carbon nanotube; metals such as Al, Pb, Sn, In, Bi, Ag, Ba, Ga, Hg, Pd, Pt, Te, Zn, La and alloys thereof; and metal oxides such as aluminum oxide, tin oxide, indium oxide, zinc oxide, and lithium oxide. These can be used alone or in combination of two or more.

Examples of the negative electrode binder include polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamideimide and the like. In addition to the above, styrene butadiene rubber (SBR) and the like can be used. When an aqueous binder such as an SBR emulsion is used, a thickener such as carboxymethyl cellulose (CMC) can also be used. The amount of the negative electrode binder is preferably 0.5 to 20 parts by mass based on 100 parts by mass of the negative electrode active material, from the viewpoint of the sufficient binding strength and the high energy density being in a trade-off relation with each other. The above-mentioned binders for a negative electrode may be mixed and used.

The negative electrode active material may be used together with a conductive assisting agent. Specific examples of the conductive assisting agent are the same as those specifically exemplified in the positive electrode, and the usage amount thereof may be the same.

As the negative electrode current collector, from the view point of electrochemical stability, aluminum, nickel, copper, silver, and alloys thereof are preferred. As the shape thereof, foil, flat plate, mesh and the like are exemplified.

Examples of a method for forming the negative electrode active material layer include a doctor blade method, a die coater method, a CVD method, a sputtering method, and the like. It is also possible that, after forming the negative electrode active material layer in advance, a thin film of aluminum, nickel or an alloy thereof may be formed by a method such as vapor deposition, sputtering or the like to obtain a negative electrode current collector.

<Positive Electrode>

The positive electrode includes a positive electrode active material capable of reversibly absorbing and desorbing lithium ions with charge and discharge and it has a structure in which the positive electrode active material is laminated on a current collector as a positive electrode active material layer integrated by a positive electrode binder.

The positive electrode active material in the present embodiment is sot particularly limited as long as it is a material capable of absorb and desorb lithium, but from the viewpoint of high energy density, a compound having high capacity is preferably contained. Examples of the high capacity compound include lithium nickel composite oxides in which a part of the Ni of lithium nickelate (LiNiO$_2$) is replaced by another metal element, and layered lithium nickel composite oxides represented by the following formula (A) are preferred.

$$Li_yNi_{(1-x)}M_xO_2 \quad (A)$$

wherein 0≤x<1, 0<y≤1.20, and M is at least one element selected from the group consisting of Co, Al, Mn, Fe, Ti, and B.

In addition, from the viewpoint of high capacity, it is preferred that the content of Ni is high, that is, x is less than 0.5, further preferably 0.4 or less in the formula (A). Examples of such compounds include $Li_\alpha Ni_\beta Co_\gamma Mn_\delta O_2$ (1≤α≤1.2, β+γ+δ=1, β≥0.7, and γ≤0.2) and $Li_\alpha Ni_\beta Co_\gamma Al_\delta O_2$ (1≤α≤1.2, β+γ+δ=1, β≥0.7, and γ≤0.2) and particularly include $LiNi_\beta Co_\gamma Mn_\delta O_2$ (0.75≤β≤0.85, 0.05≤γ≤0.15, and 0.10≤δ≤0.20). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (A). In addition, it is also preferred that particular transition metals do not exceed half. Examples of such compounds include $Li_\alpha Ni_\beta Co_\gamma Mn_\delta O_2$ (1≤α≤1.2, β+γ+δ=1, 0.2≤β≤0.5, 0.1≤γ≤0.4, and 0.1≤δ≤0.4). More specific examples may include $LiNi_{0.4}Co_{0.8}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.8}Mn_{0.2}O_2$ (abbreviated as NCM532) (also including those in which the content of each transition metal fluctuates by about 10% in these compounds).

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (A)) and a material in which the content of Ni does not exceed 0.5 (x is 0.5 or more, for example, NCM433), a battery having high capacity and high thermal stability can also be formed.

Examples of the positive electrode active materials other than the above include lithium manganate having a layered structure or a spinel structure such as $LiMnO_2$, $Li_xMn_2O_4$ (0<x<2), $Li_2MnO_3$, and $Li_xMn_{1.5}Ni_{0.5}O_4$ (0<x<2); $LiCoO_2$ or materials in which a part of the transition metal in this material is replaced by other metal(s); materials in which Li is excessive as compared with the stoichiometric composition in these lithium transition metal oxides; materials having olivine structure such as $LiMPO_4$, and the like. In addition, materials in which a part of elements in these metal oxides is substituted, by Al, Fe, P, Ti, Si, Pb, Sn, In, Bi, Ag, Ba, Ca, Hg, Pd, Pt, Te, Zn, La are also usable. The positive electrode active materials described above may be used alone or in combination of two or more.

As the positive electrode binder, the same binder as the negative electrode binder can be used. Among them, polyvinylidene fluoride or polytetrafluoroethylene is preferable from the viewpoint of versatility and low cost, and polyvinylidene fluoride is more preferable. The amount of the positive electrode binder is preferably 2 to 10 parts by mass based on 100 parts by mass of the positive electrode active material, from the viewpoint of the binding strength and energy density that are in a trade-off relation with each other.

For the coating layer containing the positive electrode active material, a conductive assisting agent may be added for the purpose of lowering the impedance. Examples of the conductive assisting agent include flake-like, soot, and fibrous carbon fine particles and the like, for example, graphite, carbon black, acetylene black, vapor grown carbon fibers (for example, VGCF manufactured by Showa Denko) and the like.

As the positive electrode current collector, the same material as the negative electrode current collector can be used. In particular, as the positive electrode, a current collector using aluminum, an aluminum alloy, or iron-nickel-chromium-molybdenum based stainless steel is preferable.

Similar to the negative electrode, the positive electrode may be prepared by forming a positive electrode active material layer containing a positive electrode active material and a binder for positive electrode on a positive electrode current collector.

<Electrolyte Solution>

The electrolyte solution of the lithium ion secondary battery according to the present embodiment is not particularly limited, but is preferably a nonaqueous electrolyte solution containing a nonaqueous solvent and a supporting salt that is stable at the operating potential of the battery.

Examples of nonaqueous solvents include aprotic organic solvents, for examples, cyclic carbonates such as propylene carbonate (PC), ethylene carbonate (EC) and butylene carbonate (BC); open-chain carbonates such as dimethyl carbonate (DMC), diethyl carbonate (DEC), ethyl methyl carbonate (EMC) and dipropyl carbonate (DPC); aliphatic carboxylic acid esters such as propylene carbonate derivatives, methyl formate, methyl acetate and ethyl propionate; ethers such as diethyl ether and ethyl propyl ether; phosphoric acid esters such as trimethyl phosphate, triethyl phosphate, tripropyl phosphate, trioctyl phosphate and triphenyl phosphate; and fluorinated aprotic organic solvents obtainable by substituting at least a part of the hydrogen atoms of these compounds with fluorine atom(s), and the like.

Among them, cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (MEC), dipropyl carbonate (DPC) and the like is preferably contained.

Nonaqueous solvent may be used alone, or in combination of two or more.

The supporting salts include lithium salts, such as $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_8$, and $LiN(CF_3SO_2)_2$. Supporting salts may be used alone or in combination of two or more. From the viewpoint of cost reduction, $LiPF_6$ is preferable.

The electrolyte solution may further contain additives. The additive is not particularly limited, and examples thereof include halogenated cyclic carbonates, unsaturated cyclic carbonates, cyclic or open-chain disulfonic acid esters, and the like. The addition of these compounds improves battery characteristics such as cycle characteristics. This is presumably because these additives decompose during charging and discharging of the lithium ion secondary battery to form a film on the surface of the electrode active material and inhibit decomposition of the electrolyte solution and supporting salt. It is considered that the film formation effect on the surface of the negative electrode by the additive is further enhanced due to the effect of preventing the damage of the coating on the graphite surface in the present invention. Therefore, the cycle characteristics may be further improved by additives in some cases. The additives listed above are specifically described below.

As the halogenated cyclic carbonate, the examples thereof include a compound represented by the following formula (B).

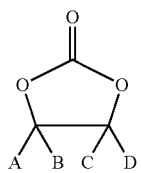

(B)

In the formula (B), A, B, C and D each independently represent a hydrogen atom, a halogen atom, an alkyl group or a halogenated alkyl group having 1 to 6 carbon atoms, and at least one of A, B, C and D is a halogen atom or a halogenated alkyl group. The alkyl group and the halogenated alkyl group have preferably 1 to 4 carbon atoms, and more preferably 1 to 3 carbon atoms.

In one embodiment, the halogenated cyclic carbonate is preferably a fluorinated cyclic carbonate. The examples of the fluorinated cyclic carbonates include compounds in which a part or all of the hydrogen atoms of ethylene carbonate (EC), propylene carbonate (PC), butylene carbonate (BC) and the like are substituted with fluorine atoms, and the like. Among these, 4-fluoro-1,3-dioxolan-2-one (fluoroethylene carbonate: FEC) is preferred.

The content of the fluorinated cyclic carbonate is not particularly limited, but it is preferably 0.01% by mass or more and 1% by mass or less in the electrolytic solution. When it is contained in an amount of 0.01% by mass or more, a sufficient film forming effect can be obtained. When the content is 1% by mass or less, gas generation due to decomposition of the fluorinated cyclic carbonate itself can be reduced. In the present embodiment, the content is more preferably 0.8% by mass or less. By setting the content of the fluorinated cyclic carbonate to 0.8% by mass or less, it is possible to suppress the decrease in the activity of the negative electrode active material and maintain good cycle characteristics.

Unsaturated cyclic carbonates are cyclic carbonates having at least one carbon-carbon unsaturated bond in a molecule, and the examples thereof include vinylene carbonate compounds such as vinylene carbonate, methyl vinylene carbonate, ethyl vinylene carbonate, 4,5-dimethyl vinylene carbonate, 4,5-diethyl vinylene carbonate; vinyl ethylene carbonate compounds such as 4-vinyl ethylene carbonate, 4-methyl-4-vinyl ethylene carbonate, 4-ethyl-4-vinyl ethylene carbonate, 4-n-propyl-4-vinylene ethylene carbonate, 5-methyl-4-vinyl ethylene carbonate, 4,4-divinyl ethylene carbonate, 4,5-divinyl ethylene carbonate, 4,4-dimethyl-5-methylene ethylene carbonate, 4,4-diethyl-5-methylene ethylene carbonate; and the like. Among these, vinylene carbonate and 4-vinylethylene carbonate are preferable, and vinylene carbonate is particularly preferable.

The content of the unsaturated cyclic carbonate is not particularly limited, but it is preferably 0.01% by mass or more and 10% by mass or less in the electrolytic solution. When it is contained in an amount of 0.01% by mass or more, a sufficient film forming effect can be obtained. When the content is 10% by mass or less, gas generation due to the decomposition of the unsaturated cyclic carbonate itself can be reduced. In the present embodiment, from the viewpoint of suppressing the decrease in the activity of the negative electrode active material, it is more preferably 5% by mass or less.

As the cyclic or open-chain disulfonic acid esters, cyclic disulfonic acid esters represented by the following formula (C) or open-chain disulfonic acid esters represented by the following formula (D) can be exemplified.

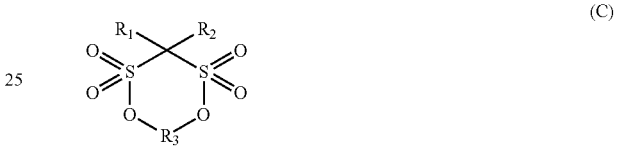

(C)

In the formula (C), $R_1$ and $R_2$, independently each other, represent a substituent selected from the group consisting of a hydrogen atom, an alkyl group having 1 to 5 carbon atoms, a halogen group, and an amino group, $R_3$ represents an alkylene group having 1 to 5 carbon atoms, a carbonyl group, a sulfonyl group, a fluoroalkylene group having 1 to 6 carbon atoms, or a divalent group having 2 to 6 carbon atoms in which alkylene units or fluoroalkylene units are bonded via ether group.

In the formula (C), $R_1$ and $R_2$ are each independently preferably a hydrogen atom, an alkyl group having 1 to 3 carbon atoms or a halogen group, and $R_3$ is more preferably an alkylene group or fluoroalkylene group having 1 or 2 carbon atoms.

Preferable examples of the cyclic disulfonic acid esters represented by the formula (C) include compounds represented by the following formulae (1) to (20).

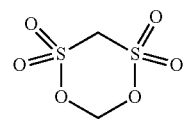

(1)

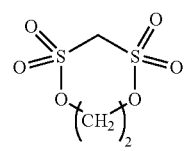

(2)

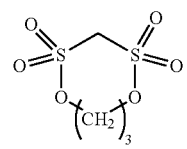

(3)

(4) 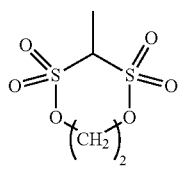
(5) 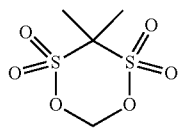
(6) 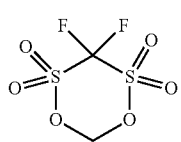
(7) 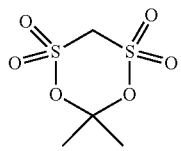
(8) 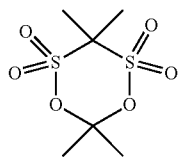
(9) 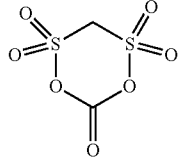
(10) 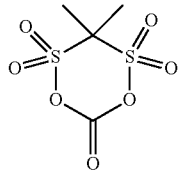
(11) 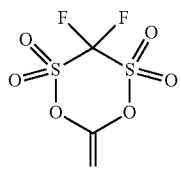
(12) 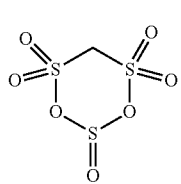
(13) 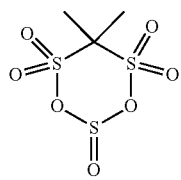
(14) 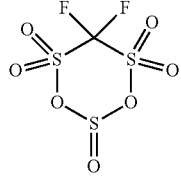
(15) 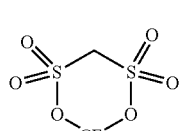
(16) 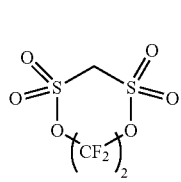
(17) 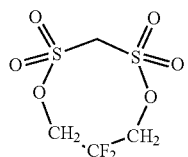
(18) 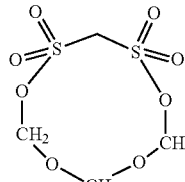
(19) 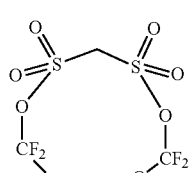
(20) 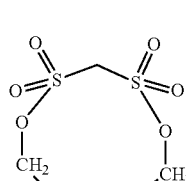

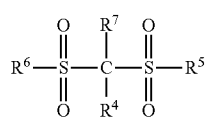

(D)

In the formula (D), $R^4$ and $R^7$, independently each other, represent an atom or a group selected from the group consisting of a hydrogen atom, an alkyl group having 1 to 5 carbon atoms, an alkoxy group having 1 to 5 carbon atoms, an fluoroalkyl group having 1 to 5 carbon atoms, an polyfluoroalkyl group having 1 to 5 carbon atoms, —$SO_2X_3$ ($X_3$ is an alkyl group having 1 to 5 carbon atoms), —$SY_1$ ($Y_1$ is an alkyl group having 1 to 5 carbon atoms), —COZ (Z is a hydrogen atom or an alkyl group having 1 to 5 carbon atoms), and a halogen atom. $R^5$ and $R^6$, independently each other, represent an atom or a group selected from an alkyl group having 1 to 5 carbon atoms, an alkoxy group having 1 to 5 carbon atoms, a phenoxy group, a fluoroalkyl group having 1 to 5 carbon atoms, a polyfluoroalkyl group having 1 to 5 carbon atoms, a fluoroalkoxy group having 1 to 5 carbon atoms, a polyfluoroalkoxy group having 1 to 5 carbon atoms, a hydroxyl group, a halogen atom, —$NX_4X_5$ ($X_4$ and $X_5$ are, independently each other, a hydrogen atom or an alkyl group having 1 to 5 carbon atoms) or —$NY_2CONY_3Y_4$ ($Y_2$ to $Y_4$ are, independently each other, a hydrogen atom or an alkyl group having 1 to 5 carbon atoms).

In the formula (D), $R^4$ and $R^7$ are, independently each other, preferably a hydrogen atom, an alkyl group having 1 or 2 carbon atoms, a fluoroalkyl group having 1 or 2 carbon atoms, or a halogen atom, and $R^5$ and $R^6$, independently each other, more preferably represent an alkyl group having 1 to 3 carbon atoms, an alkoxy group having 1 to 3 carbon atoms, a fluoroalkyl group having 1 to 3 carbon atoms, a polyfluoroalkyl group having 1 to 3 carbon atoms, a hydroxyl group or a halogen atom.

Preferred compounds of the open-chain disulfonic acid ester compound represented by the formula (D) include, for example, the following compounds.

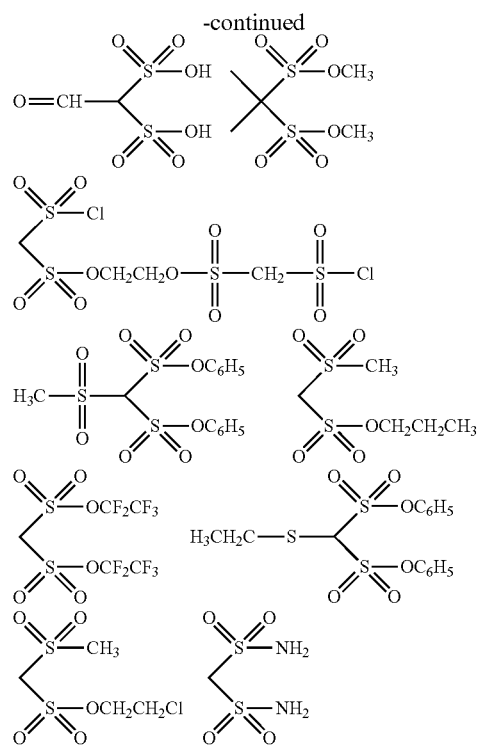

The content of the cyclic or open-chain disulfonic acid ester is preferably 0.005 mol/L or more and 10 mol/L or less in the electrolyte solution, more preferably 0.01 mol/L or more and 5 mol/L or less, and particularly preferably 0.05 mol/L or more and 0.15 mol/L or less. When it is contained in an amount of 0.005 mol/L or more, a sufficient film forming effect can be obtained. When the content is 10 mol/L or less, it is possible to suppress an increase in the viscosity of the electrolyte solution and an increase thereby in resistance.

Additives may be used alone or in combination of two or more. When two or more kinds of additives are used in combination, the total content of the additives is preferably 10% by mass or less, more preferably 5% by mass or less in the electrolyte solution.

<Separator>

The separator may be of any type as long as it suppresses electron conduction between the positive electrode and the negative electrode, does not inhibit the permeation of charged substances, and has durability against the electrolyte solution. Specific examples of the material include polyolefins such as polypropylene and polyethylene; cellulose, polyethylene terephthalate, polyimide, polyvinylidene fluoride and aromatic polyamides (aramid) such as polymetaphenylene isophthalamide, polyparaphenylene terephthalamide and copolyparaphenylene 3,4'-oxydiphenylene terephthalamide; and the like. These can be used as porous films, woven fabrics, nonwoven fabrics and the like.

<Method for Producing Lithium Ion Secondary Battery>

The lithium ion secondary battery according to the present embodiment can be manufactured according to conventional method. An example of a method for manufacturing a lithium ion secondary battery will be described taking a stacked laminate type lithium ion secondary battery as an example. First, in the dry air or an inert atmosphere, the positive electrode and the negative electrode are placed to oppose to each other via a separator to form the above-mentioned electrode element. Next, this electrode element is accommodated in an outer package (container), an electrolyte solution is injected, and the electrode is impregnated with the electrolyte solution. Thereafter, the opening of the outer package is sealed to complete the lithium ion secondary battery.

Figure 2:
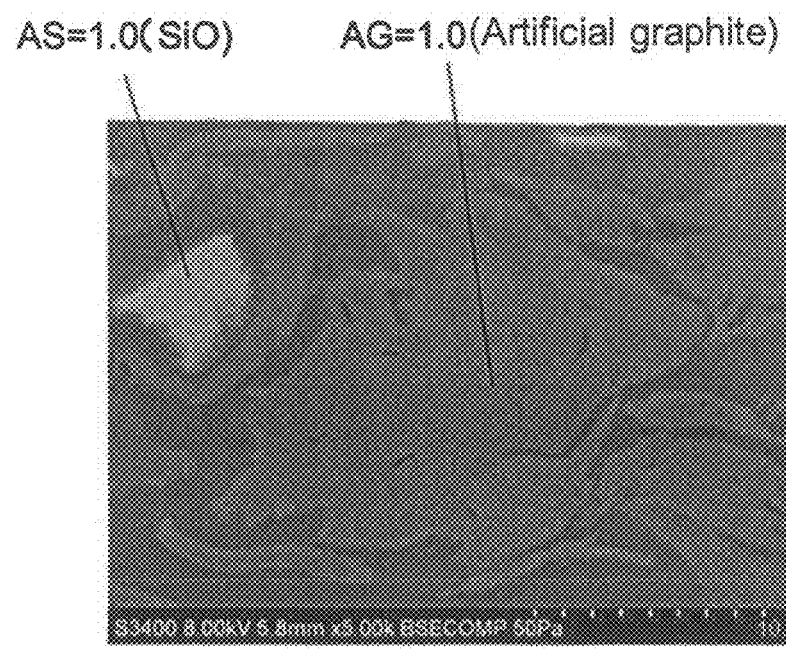
FIG. 2 is an SEM-observed-picture (5,000 magnifications) of a negative electrode cross section in which the aspect ratio (AG) of the artificial graphite is 1.0 and the aspect ratio (AS) of SiO is 1.0.
Figure 3:
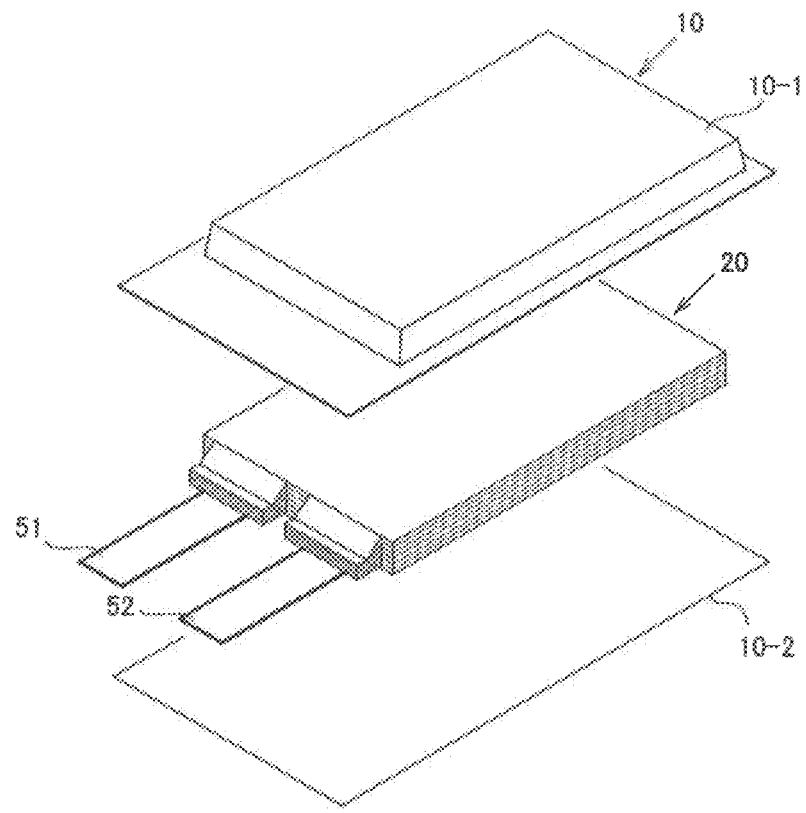
FIG. 3 is an exploded perspective view showing a basic structure of a film package battery.

The lithium ion secondary battery according to the present embodiment may be, for example, a secondary battery having a structure as shown in FIGS. 2 and 3. This secondary battery comprises a battery element 20, a film package 10 housing the battery element 20 together with an electrolyte, and a positive electrode tab 51 and a negative electrode tab 52 (hereinafter these are also simply referred to as "electrode tabs").

Figure 4:
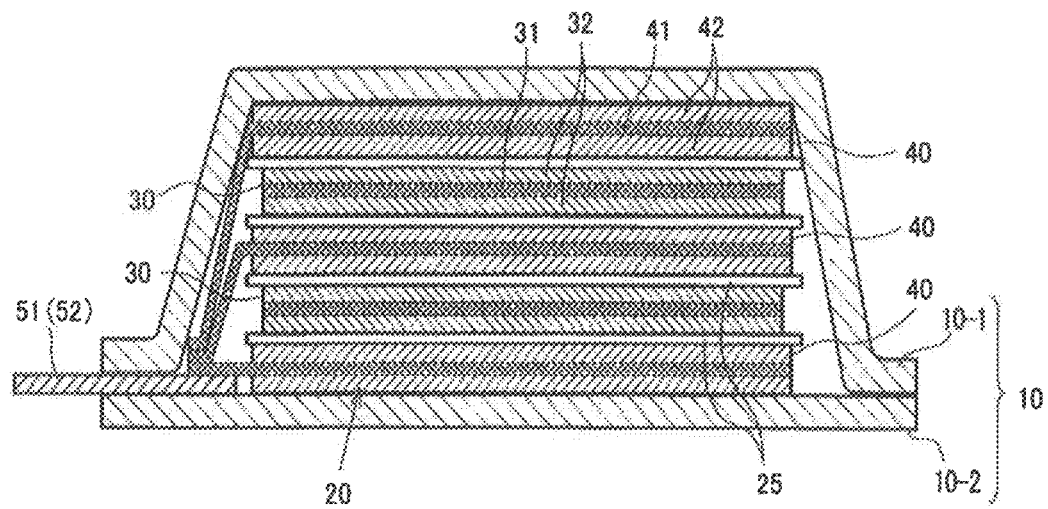
FIG. 4 is a cross-sectional view schematically showing a cross section of the battery of FIG. 3.

In the battery element 20, a plurality of positive electrodes 30 and a plurality of negative electrodes 40 are alternately stacked with separators 25 sandwiched therebetween as shown in FIG. 4. In the positive electrode 30, an electrode material 32 is applied to both surfaces of a metal foil 31, and also in the negative electrode 40, an electrode material 42 is applied to both surfaces of a metal foil 41 in the same manner.

As shown in FIG. 3, the secondary battery may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in a part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 4). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 4, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 3 and FIG. 4, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

<Assembled Battery>

A plurality of lithium ion secondary batteries according to the present embodiment may be combined to form an assembled battery. The assembled battery may be configured by connecting two or more lithium ion secondary batteries according to the present embodiment in series or in parallel or in combination of both. The connection in series and/or parallel makes it possible to adjust the capacitance and voltage freely. The number of lithium ion secondary batteries included in the assembled battery can be set appropriately according to the battery capacity and output.

<Vehicle>

The lithium ion, secondary battery or the assembled battery according to the present embodiment can be used in vehicles. Vehicles according to an embodiment of the present invention include hybrid vehicles, fuel cell vehicles, electric vehicles (besides four-wheel vehicles (cars, trucks, commercial vehicles such as buses, light automobiles, etc.) two-wheeled vehicle (bike) and tricycle), and the like. The vehicles according to the present embodiment is not limited to automobiles, it may be a variety of power source of other vehicles, such as a moving body like a train.

<Power Storage Equipment>

The lithium ion secondary battery or the assembled battery according to the present embodiment can be used in power storage system. The power storage systems according to the present embodiment include, for example, those which is connected between the commercial power supply and loads of household appliances and used, as a backup power source or an auxiliary power in the event of power outage or the like, or those used as a large scale power storage that stabilize power output with large time variation supplied by renewable energy, for example, solar power generation.

EXAMPLE

Example 1

<Manufacturing of Lithium Ion Secondary Battery>

Polyvinylidene fluoride (PVdF) as a binder in an amount of 3% by mass based on the mass of the positive electrode active material, and a layered lithium nickel composite oxide ($LiNi_{0.8}Co_{0.15}Al_{0.05}O_2$) in a remaining amount other than the above, are dispersed uniformly in NMP using a rotation revolution type three-axis mixer excellent in stirring and mixing, to prepare a positive electrode slurry. The positive electrode slurry was uniformly applied to a positive electrode current collector of aluminum foil with a thickness of 20 μm using a coater. After drying by evaporating NMP, the back side was also coated in the same way. After drying, the density was adjusted by roll press, to prepare positive electrode active material layers on both sides of the current collector. The mass per unit area of the positive electrode active material layer was 50 mg/cm$^2$.

Artificial graphite (G/D ratio=4.8) and SiO (G/D ratio=0.84) were dispersed uniformly in an aqueous solution containing 1% by mass of CMC (carboxymethyl cellulose) using a rotation revolution type three-axis mixer excellent in stirring and mixing so that the mixing ratio thereof in the negative electrode active material layer was 95:5. Then, using SBR binder (the content in the negative electrode was 2% by mass) as a binder, negative electrode slurry was prepared. The negative electrode slurry was uniformly applied to a negative electrode current collector of copper foil with a thickness of 10 μm using a coater. After drying by evaporating water, the back side was also coated in the same way. After drying, the density was adjusted by roll press, to prepare negative electrode active material layers on both sides of the current collector. The mass per unit area of the negative electrode active material layer was 20 mg/cm$^2$.

For the electrolyte solution, 1 mol/L of $LiPF_6$ as an electrolyte was dissolved in a solvent of ethylene carbonate (EC): diethyl carbonate (DEC)=30.70 (vol %).

The resulting positive electrode was cut into 13 cm×7 cm, and the negative electrode was cut into 12 cm×6 cm. The both surfaces of the positive electrode was covered by a polypropylene separator of 14 cm×8 cm, the negative active material layer was disposed thereon so as to face the positive electrode active material layer, to prepare an electrode stack. Next, the electrode stack was sandwiched by two sheets of aluminum laminate film of 15 cm×9 cm, the three sides excluding one side of long side were heat sealed with a seal width of 8 mm. After injecting the electrolyte solution, the remaining side was heat sealed, to produce a laminate cell type battery.

<Measurement of Capacity Retention Ratio>

300 times of charge-discharge cycle test were performed in a thermostatic oven at 45° C. to measure the capacity retention ratio and to evaluate the lifetime, in the charge, the secondary battery was charged, at 1 C up to maximum voltage of 4.2 V and then subjected to constant voltage charge at 4.2 V, and the total charge time was 2.5 hours. In the discharge, the secondary battery was subjected to constant current discharge at 1 C to 2.5 V. The capacity after the charge-discharge cycle test was measured, and the ratio to the capacity before the charge-discharge cycle test was calculated. The results are shown in Table 1.

<Cross-Section Observation by SEM>

The negative electrode for measuring aspect ratio, which was prepared in the same manner as used to manufacture the battery, was cut and its cross section was observed with SEM. Number average aspect ratios of randomly selected 20 SiO particles and randomly selected 20 artificial graphite particles were respectively determined. The results are shown in Table 1.

<Measurement of Particle Size>

The median diameter was measured with a particle size distribution measuring apparatus by a laser diffraction scattering method. The 50% cumulative diameter $D_{50G}$ of the artificial graphite material used in the cell evaluation in this example was 14 μm, and the 50% cumulative diameter $D_{50S}$ of the SiO material used in the cell evaluation in this example was 5 μm. The results are shown in Table 1.

<Raman Spectroscopic Analysis>

The crystallinity of the graphite material in the negative electrode was measured using a laser Raman spectrometer. The excitation wavelength of the laser was set to 532.15 nm and the exposure time was set as accumulation of twice of 20 seconds. The results of the G/D ratio are shown in Table 1.

Example 2 to 17

In each example, a negative electrode was produced in the same manner as in Example 1, using SiO particles and artificial graphite particles, which have different particle shape from Example 1 and have the aspect ratios as described in Table 1. Also regarding the layered lithium nickel composite oxide, lithium nickel composite oxides denoted, by $Li_\alpha Ni_\beta Co_\gamma Mn_\delta O_2$ or $Li_\alpha Ni_\beta Co_\gamma Al_\delta O_2$ was used as a positive electrode active material. In the lithium nickel composite oxides, the molar ratio (%) of each metal element to 1 mol of Li was set as described in Table 1. Except for that, the batteries were prepared in the same manner as in Example 1, and determination of capacity retention ratio and calculation of aspect ratios of the artificial graphite and SiO from cross section observation by SEM were respectively carried out in the same manner. In addition, the particle sizes of the artificial graphite and SiO and Raman spectroscopic G/D ratios of the artificial graphite were also measured in the same manner. The results are shown in Table 1 in addition to Example 1.

Comparative Examples 1 to 18

A negative electrode was produced in the same manner as in Example 1, using SiO particles and artificial graphite particles which have a different particle shape from Example 1 and have the aspect ratios as described in Table 2. Except for that, the batteries were prepared in the same manner as in Example 1, and determination of the capacity retention ratio and calculation of the aspect ratios of the artificial graphite and SiO from cross section observation by SEM were respectively carried out in the same manner. In addition, the particle sizes of the artificial graphite and SiO and the Raman spectroscopic G/D ratios of the artificial graphite were also measured in the same manner. The results are shown in Table 2.

In the example in which the ratio of the aspect ratio of artificial graphite particles (AG) to the aspect ratio of SiO particles (AS) is within the range of 0.6 to 1.6, the capacity maintenance ratio after 300 cycles at 45° C. was higher than that of the comparative example, and therefore the cycle characteristics tended to be improved. Among them, in Examples in which AG/AS was 1, the cycle characteristics were the best.

TABLE 1

| Samples | Positive electrode mixing ratio | | | | Mixing ratio of negative electrode active materials | | Aspect ratio | | | Capacity retention ratio after 300 cycles at 45° C. | Median diameter (μm) | | G/D ratio of graphite material |
|---|---|---|---|---|---|---|---|---|---|---|---|---|---|
| | Ni | Co | Mn | Al | Artificial graphite | SiO | Aspect ratio of artificial graphite (AG) | Aspect ratio of SiO (AS) | AG/AS | | $D_{50G}$ | $D_{G0S}$ | |
| Example 1 | 80 | 15 | 5 | | 95 | 5 | 2.0 | 3.0 | 0.67 | 88 | 14 | 5 | 4.8 |
| Example 2 | 80 | 15 | 5 | | 95 | 5 | 1.0 | 1.5 | 0.67 | 88 | 14 | 5 | 4.8 |
| Example 3 | 80 | 15 | 5 | | 95 | 5 | 1.0 | 1.5 | 0.67 | 88 | 14 | 5 | 4.8 |
| Example 4 | 80 | 15 | 5 | | 95 | 5 | 3.0 | 4.0 | 0.75 | 89 | 14 | 5 | 4.8 |
| Example 5 | 80 | 15 | 5 | | 95 | 5 | 3.0 | 2.5 | 0.80 | 89 | 14 | 5 | 4.8 |
| Example 6 | 80 | 15 | 5 | | 95 | 5 | 1.0 | 1.0 | 1.00 | 90 | 14 | 5 | 4.8 |
| Example 7 | 80 | 15 | 5 | | 95 | 5 | 2.0 | 2.0 | 1.00 | 91 | 14 | 5 | 4.8 |
| Example 8 | 80 | 15 | 5 | | 95 | 5 | 3.0 | 3.0 | 1.00 | 92 | 14 | 5 | 4.8 |
| Example 9 | 80 | 15 | 5 | | 95 | 5 | 4.0 | 4.0 | 1.00 | 93 | 14 | 5 | 4.8 |
| Example 10 | 80 | 15 | | 5 | 95 | 5 | 5.0 | 5.0 | 1.00 | 95 | 14 | 5 | 4.8 |
| Example 11 | 80 | 10 | 10 | | 95 | 5 | 3.0 | 3.0 | 1.00 | 94 | 14 | 5 | 4.8 |
| Example 12 | 80 | 5 | 15 | | 95 | 5 | 3.0 | 3.0 | 1.00 | 98 | 14 | 5 | 4.8 |
| Example 13 | 50 | 20 | 80 | | 95 | 5 | 3.0 | 3.0 | 1.00 | 96 | 14 | 5 | 4.8 |
| Example 14 | 34 | 33 | 33 | | 95 | 5 | 3.0 | 3.0 | 1.00 | 97 | 14 | 5 | 4.8 |
| Example 15 | 80 | 15 | 5 | | 95 | 5 | 2.0 | 2.0 | 1.00 | 93 | 14 | 5 | 4.8 |

TABLE 1-continued

| Samples | Positive electrode mixing ratio | | | | Mixing ratio of negative electrode active materials | | Aspect ratio of artificial graphite (AG) | Aspect ratio of SiO (AS) | AG/AS | Capacity retention ratio after 300 cycles at 45° C. | Median diameter (μm) | | G/D ratio of graphite material |
|---|---|---|---|---|---|---|---|---|---|---|---|---|---|
| | Ni | Co | Mn | Al | Artificial graphite | SiO | | | | | $D_{SOG}$ | $D_{GO8}$ | |
| Example 16 | 80 | 15 | 5 | | 95 | 5 | 1.5 | 1.0 | 1.50 | 88 | 14 | 5 | 4.8 |
| Example 17 | 80 | 15 | 5 | | 95 | 5 | 3.0 | 2.0 | 1.50 | 88 | 14 | 5 | 4.8 |

TABLE 2

| Samples | Positive electrode mixing ratio | | | | Mixing ratio of negative electrode active materials | | Aspect ratio of artificial graphite (AG) | Aspect ratio of SiO (AS) | AG/AS | Capacity retention ratio after 300 cycles at 45° C. | Median diameter (μm) | | G/D ratio of graphite material |
|---|---|---|---|---|---|---|---|---|---|---|---|---|---|
| | Ni | Co | Mn | Al | Artificial graphite | SiO | | | | | $D_{SOG}$ | $D_{GO8}$ | |
| Comparative example 1 | 80 | 15 | 5 | | 95 | 5 | 1.0 | 5.0 | 0.20 | 88 | 14 | 5 | 4.8 |
| Comparative example 2 | 80 | 15 | 5 | | 95 | 5 | 1.0 | 4.0 | 0.25 | 80 | 14 | 5 | 4.8 |
| Comparative example 3 | 80 | 15 | 5 | | 95 | 5 | 1.0 | 4.0 | 0.25 | 80 | 14 | 5 | 4.8 |
| Comparative example 4 | 80 | 15 | 5 | | 95 | 5 | 1.0 | 3.0 | 0.33 | 82 | 14 | 5 | 4.8 |
| Comparative example 5 | 80 | 15 | 5 | | 95 | 5 | 1.0 | 3.0 | 0.33 | 82 | 14 | 5 | 4.8 |
| Comparative example 6 | 80 | 15 | 5 | | 95 | 5 | 1.0 | 2.5 | 0.40 | 84 | 14 | 5 | 4.8 |
| Comparative example 7 | 80 | 15 | 5 | | 95 | 5 | 1.0 | 2.5 | 0.40 | 84 | 14 | 5 | 4.8 |
| Comparative example 8 | 80 | 15 | 5 | | 95 | 5 | 1.0 | 2.0 | 0.50 | 86 | 14 | 5 | 4.8 |
| Comparative example 9 | 80 | 15 | 5 | | 95 | 5 | 2.0 | 4.0 | 0.50 | 86 | 14 | 5 | 4.8 |
| Comparative example 10 | 80 | 15 | 5 | | 95 | 5 | 1.0 | 2.0 | 0.50 | 86 | 14 | 5 | 4.8 |
| Comparative example 11 | 80 | 15 | 5 | | 95 | 5 | 2.0 | 1.0 | 2.00 | 86 | 14 | 5 | 4.8 |
| Comparative example 12 | 80 | 15 | 5 | | 95 | 5 | 2.5 | 1.0 | 2.50 | 84 | 14 | 5 | 4.8 |
| Comparative example 13 | 80 | 15 | 5 | | 95 | 5 | 2.5 | 1.0 | 2.50 | 84 | 14 | 5 | 4.8 |
| Comparative example 14 | 80 | 15 | 5 | | 95 | 5 | 3.0 | 1.0 | 3.00 | 82 | 14 | 5 | 4.8 |
| Comparative example 15 | 80 | 15 | 5 | | 95 | 5 | 3.0 | 1.0 | 3.00 | 82 | 14 | 5 | 4.8 |
| Comparative example 16 | 80 | 15 | 5 | | 95 | 5 | 4.0 | 1.0 | 4.00 | 80 | 14 | 5 | 4.8 |
| Comparative example 17 | 80 | 15 | 5 | | 95 | 5 | 4.0 | 1.0 | 4.00 | 80 | 14 | 5 | 4.8 |
| Comparative example 18 | 80 | 15 | 5 | | 95 | 5 | 5.0 | 1.0 | 5.00 | 90 | 14 | 5 | 4.8 |

INDUSTRIAL APPLICABILITY

The battery according to the present invention can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

EXPLANATION OF REFERENCE

10 film package
20 battery element
25 separator
30 positive electrode
40 negative electrode

The invention claimed is:

1. A lithium ion secondary battery having a negative electrode comprising a graphite and a silicon oxide having a composition represented by $SiO_x$ ($0<x\leq2$), wherein a particle number average aspect ratio of the graphite is defined as AG and a particle number average aspect ratio of the silicon oxide is defined as AS, wherein the AS is within a range of 1.5 to 5, the AG/AS is within a range of 0.6 to 1.6, and further wherein the silicon oxide has a diameter ranging from 1.0 μm to 15.0 μm, and an amount of the silicon oxide in the negative electrode is between 1% by mass or more and less than 10% by mass.

2. The lithium ion secondary battery according to claim 1, wherein $D_{50G}/D_{50S}$ is within a range of 0.6 to 5.0 when a median diameter of the graphite is defined as $D_{50G}$ and a median diameter of the silicon oxide is defined as $D_{50S}$.

3. The lithium ion secondary battery according to claim 1, wherein the graphite has a ratio (G/D) in a range of 2.0 to 5.0, wherein the ratio (G/D) is a ratio of intensity G of a peak at 1550 to 1650 $cm^{-1}$ to intensity D of a peak at 1300 to 1400 $cm^{-1}$ by Raman spectroscopic analysis.

4. A vehicle comprising the lithium ion secondary battery according to claim 1 mounted thereon.

5. A method of producing a secondary battery comprising:
a step of stacking a positive electrode and a negative electrode via a separator to produce an electrode element and
a step of enclosing the electrode element and an electrolyte solution in an outer package, wherein
the negative electrode comprises a graphite and a silicon oxide having a composition represented by $SiO_x$ ($0<x\leq2$), wherein a particle number average aspect ratio of the graphite is defined as AG and a particle number average aspect ratio of the silicon oxide is defined as AS, wherein the AS is within a range of 1.5 to 5, the AG/AS is within a range of 0.6 to 1.6, and further wherein the silicon oxide has a diameter ranging from 1.0 μm to 15.0 μm, and an amount of the silicon oxide in the negative electrode is between 1% by mass or more and less than 10% by mass.

6. The lithium ion secondary battery according to claim 1, wherein AS is within a range of 2 or more and 5 or less.

7. The lithium ion secondary battery according to claim 1, wherein the AG/AS is within a range of 0.8 to 1.2.

8. The lithium ion secondary battery according to claim 1, wherein the AG/AS is within a range of 0.9 to 1.1.

9. The lithium ion secondary battery according to claim 1, wherein the amount of the silicon oxide in the negative electrode is between 3% by mass or more and less than 10% by mass.

* * * * *